United States Patent [19]

Bennett

[11] Patent Number: 4,469,395

[45] Date of Patent: Sep. 4, 1984

[54] ELECTRICAL TERMINATION COMPRISING A SOFT ALUMINUM LEAD AND A TERMINAL OF HARD ALUMINUM ALLOY BUTT-WELDED THERETO

[75] Inventor: Moreland P. Bennett, Hickory, N.C.

[73] Assignee: General Electric Company, King of Prussia, Pa.

[21] Appl. No.: 344,107

[22] Filed: Jan. 29, 1982

[51] Int. Cl.$^3$ ............................................. H01R 3/00
[52] U.S. Cl. ................................................. 339/278 C
[58] Field of Search .................. 339/263, 275, 278 C, 339/277; 174/94 R, ; 228/101, 174, 214

[56] References Cited

U.S. PATENT DOCUMENTS

| | | | |
|---|---|---|---|
| 3,233,211 | 2/1966 | Smith | 339/275 R |
| 3,400,362 | 9/1968 | Teurlings | 339/277 R |
| 3,510,624 | 5/1970 | Bennett | 219/91 |

OTHER PUBLICATIONS

Metals Handbook, 8th Edition, vol. 6, entitled "Welding and Brazing", published in 1971 by the American Society for Metals, Metals Park, Ohio, pp. 296–308.

Primary Examiner—Joseph H. McGlynn
Assistant Examiner—David L. Pirlot
Attorney, Agent, or Firm—William Freedman

[57] ABSTRACT

A termination for high-current electrical apparatus comprises a lead in the form of an elongated strip of relatively soft aluminum, a terminal in the form of a plate of relatively hard aluminum-base alloy, and a butt weld between the edges of the strip and the plate comprising a fillet of aluminum alloy extending across the width of the terminal. A plurality of holes in the lead adjacent the butt weld serve to weaken the lead sufficiently so that the lead in the region of the holes is more susceptible to deformation than the weld as a result of bending forces applied to the termination through the terminal.

6 Claims, 5 Drawing Figures

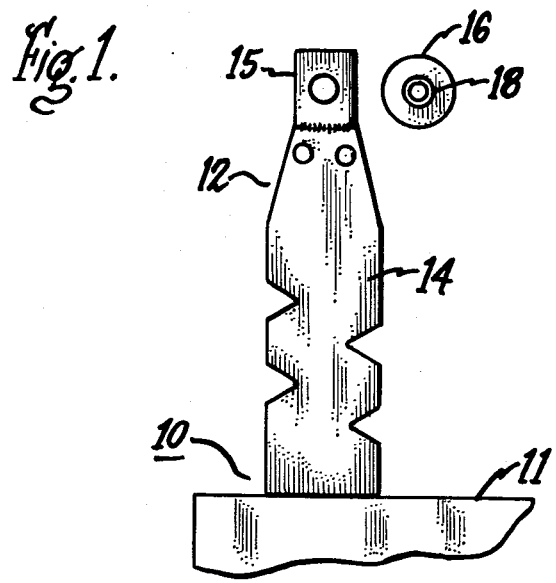
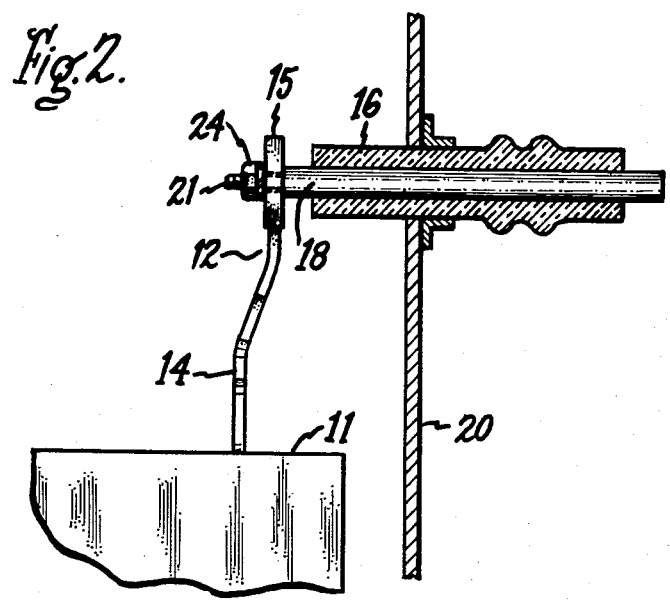

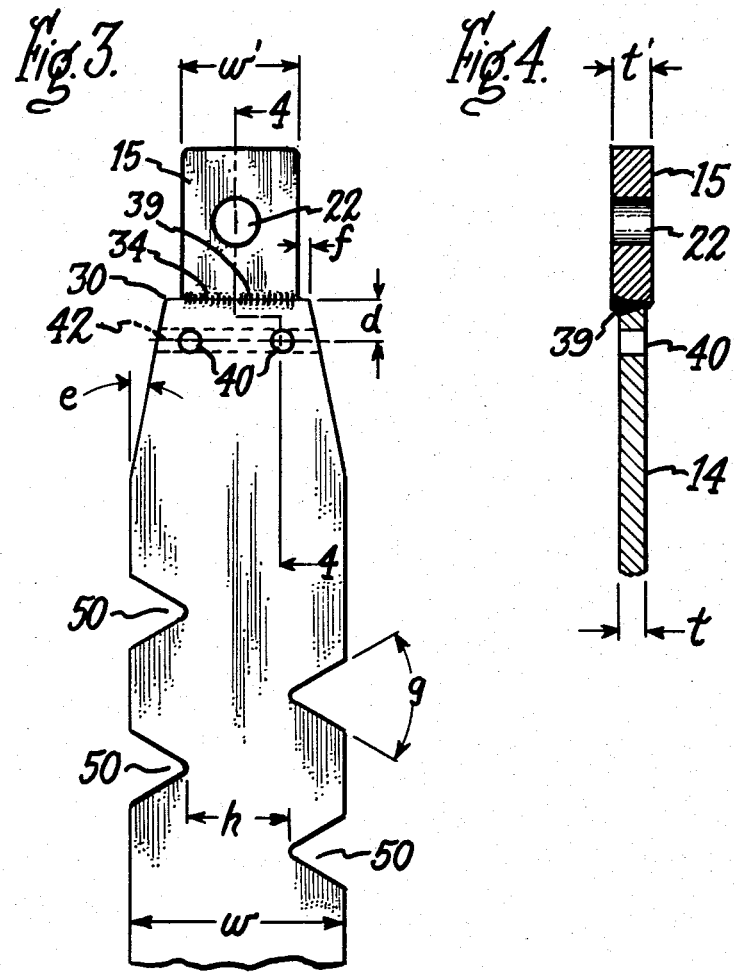
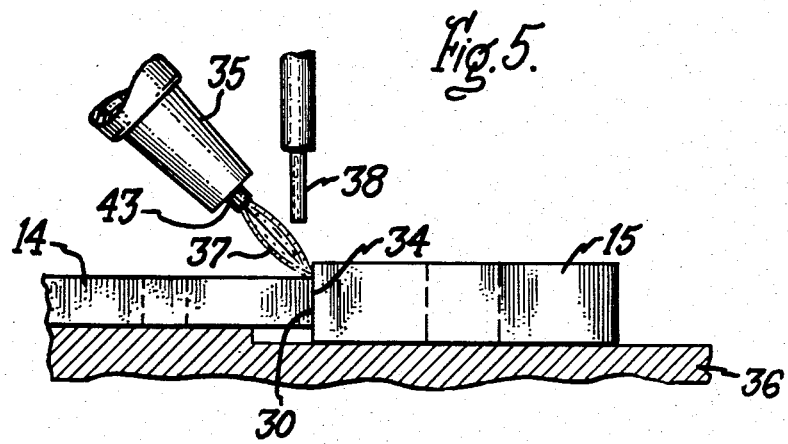

ELECTRICAL TERMINATION COMPRISING A SOFT ALUMINUM LEAD AND A TERMINAL OF HARD ALUMINUM ALLOY BUTT-WELDED THERETO

BACKGROUND

This invention relates to a termination for high current electrical apparatus and, more particularly, to a termination that comprises a terminal of hard aluminum alloy and an elongated lead of relatively soft aluminum strip butt-welded at one end to the terminal.

Certain electrical apparatus, e.g., the coil assembly in a distribution-type transformer, comprises a lead of relatively soft, high-conductivity aluminum strip which must be connected to a bushing stud or the like. A bolted connection is typically used for connecting to the stud, but the soft aluminum lead does not lend itself to direct bolting to the stud because, among other things, the soft aluminum tends to cold flow and adversely affect the long-term reliability of such a joint.

For overcoming this problem, a transition element (or terminal) of hard aluminum alloy has sometimes been introduced between the soft aluminum lead and the bushing stud. Such a hard aluminum terminal can be butt-welded to the end of the strip forming the lead, but prior efforts to do this have resulted in butt-welded joints that were not as strong and damage-resistant as might be desired. In this regard, it should be noted that the terminal often does not line up very well with the bushing stud to which it is to be connected, and it then becomes necessary for the assembler to drastically bend or twist the lead-terminal assembly in order to properly position the terminal to mate with the bushing stud. Such bending and twisting can subject the weld to severe stresses which can produce undesirable cracks in it.

SUMMARY

An object of my invention is to construct the lead-terminal assembly in such a way that the butt-welded joint between the soft aluminum lead and the hard aluminum-alloy terminal is not susceptible to cracking or other damage as a result of such bending or twisting.

Another object is to decrease the susceptibility of such a joint to stress-cracking or other damage as a result of vibrations, such as might occur during shipment or operation of the electrical apparatus.

In carrying out the invention in one form, I provide a termination that comprises a lead and a terminal welded to the lead. The lead comprises a strip of relatively soft aluminum having an outer edge at its distal end. The terminal comprises a plate of relatively hard aluminum-base alloy having an edge facing the outer edge of the strip. A butt weld between said edges joins the lead and the terminal and comprises a fillet of aluminum alloy extending across the width of the terminal adjacent the terminal edge. Closely adjacent the butt weld there are a plurality of holes in the lead which serve to weaken the lead sufficiently so that the lead in the region of the holes is more susceptible to deformation than the region of the weld as a result of bending forces applied to the termination through said terminal.

BRIEF DESCRIPTION OF DRAWINGS

For a better understanding of the invention, reference may be had to the following description taken in conjunction with the accompanying drawings, wherein:

FIG. 1 is a simplified side elevational view of a portion of a distribution transformer comprising a termination embodying one form of my invention. The termination is illustrated in a position that it might occupy prior to being connected to the transformer's bushing stud.

FIG. 2 is a side view of the structure of FIG. 1 but showing the termination connected to the bushing stud.

FIG. 3 is an enlarged view of the termination of FIG. 1.

FIG. 4 is a sectional view along the line 4—4 of FIG. 3.

FIG. 5 is a schematic illustration of a welding step used in making the termination of FIGS. 1-4.

DETAILED DESCRIPTION OF PREFERRED EMBODIMENTS

Referring now to FIG. 1, there is shown a coil assembly 10 for a distribution transformer. The coil assembly comprises a body 11 containing the usual turns of the coil assembly and a plurality of terminations, one of which is shown at 12, through which electric current is carried to and from the turns. The termination 12 comprises an elongated conductive lead 14 projecting upwardly from the body 11 of the coil assembly and a conductive terminal 15 at the upper end of the lead, which is butt-welded to the lead. The lower end of the termination is electrically and mechanically connected to a turn of the coil assembly by suitable means (not shown).

For carrying current to and from the termination 12, an insulating bushing 16 having a conductive stud 18 is provided. As shown in FIG. 2, this bushing extends through a metallic wall 20 of the usual tank of the transformer. In FIG. 1 the termination 12 is shown in a typical position it might occupy before being connected to the bushing stud. In order to connect the termination 12 to the stud 18, it is necessary to subject the termination to considerable bending and, in some cases, to twisting as well. FIG. 2 is a side view of the parts of FIG. 1 after the termination has been bent and twisted sufficiently to position the terminal 14 flush against the end of stud 18. The stud is shown with a threaded extension 21 that extends through a hole 22 in the terminal 15. A nut 24 threaded on the extension 20 clamps the terminal 15 against the end of the stud.

FIGS. 3 and 4 show the termination 12 in more detail. Referring now to these figures, the lead 14 is an elongated strip of relatively soft, high-conductivity aluminum, preferably substantially pure aluminum. An example of such material is an EC aluminum alloy, which is commonly defined as an aluminum alloy consisting of at least 99.45% by weight aluminum. As viewed in FIG. 3, the upper or distal end of the lead 14 has a horizontal upper edge 30. The terminal 15 has a horizontal lower edge 36 which is butt-welded to upper edge 30 of the lead 14. In a preferred form of the invention, the terminal is of a relatively hard aluminum-base alloy, preferably alloy 6101 with T6 temper. The nominal composition of 6101 alloy, in weight percentages, is 0.5% silicon, 0.6% magnesium, and the remainder aluminum.

Butt-welding is effected by a tungsten inert gas (TIG) arc-welding process schematically shown in FIG. 5. FIG. 5 depicts the parts of the termination before being incorporated in the coil assembly and as the welding operation is starting. Prior to the welding operation, terminal 15 and lead 14 are suitably clamped against a base 36 with edges 30 and 34 in engagement. A conventional TIG welding torch 35 is positioned adjacent the interface between edges 30 and 34, and an electric arc 37 is established between a tungsten electrode 43 of the torch and the work piece. Filler wire 38 is automatically fed by means of a suitable electronically-controlled device (not shown) into the arc where it is melted and deposited onto the work piece. The arc, in effect, melts the edges 30 and 34, forming a hole at the interface, and the molten metal from the filler wire fills the hole formed by the arc. The result is a fillet 39 of weld metal having the generally V-shaped cross-section shown in FIG. 4. The welding torch is moved across the width of the terminal 14, producing a fillet 39 of this V-shaped cross-section along the entire interface between edges 30 and 34. During the welding operation, an inert shielding gas, preferably argon, is fed through the welding torch, around the arc, and onto the work piece (in a conventional manner) so that the welding operation occurs in an inert atmosphere that protects the parts from undesirable oxidation and contamination while molten.

It is important that the weld at 39 be essentially free of cracks. The traditional filler wire material used for TIG welding of 6101 aluminum alloy to EC aluminum is 4043 aluminum alloy, which is an alloy primarily of aluminum and silicon. Its nominal composition in weight percentages is 4.5–6.0 Si, 0.8 Fe, 0.30 Cu, 0.05 Mn, 0.05 Mg, 0.10 Zn, 0.20 Ti, remainder aluminum, where the single values are maximums. Using such filler wire in the present application, I found that the resulting welds had a significant number of cracks, particularly after being subjected to the above-described bending during assembly of the transformer. I have very substantially reduced the number of cracks in typical welds by using, instead of the traditional filler wire material used for this combination of metals, a filler wire of 5356 aluminum alloy, which is an alloy primarily of aluminum and magnesium. Its nominal composition in weight percentages is 0.50 Si+Fe, 0.10 Cu, 0.50–0.20 Mn, 4.5–5.5 Mg, 0.05–0.20 Cr, 0.10 Zn, 0.06–0.20 Ti, remainder aluminum, where the single values are maximums.

To achieve full penetration of the fillet 39 across the entire interface thickness, yet without allowing weld-metal globules on the lower surface of the terminal 15 as depicted in FIG. 5, I position the strip 14 during the welding operation so that its lower surface is positioned in a plane that is offset from the plane containing the lower surface of the terminal 15. Thus the V-shaped fillet can extend across the entire thickness of strip 14 without extending onto the lower surface of terminal 15. The V formed by the fillet points toward the plane containing the lower surface of the terminal.

Before the above-described welding operation, the strip 14 is provided with holes 40 adjacent its edge 30, preferably by means of a punching operation. The purpose of these holes 40 is to provide in the lead a mechanically weak region 42, indicated in FIG. 3 by dot-dash lines. This region 42 is sufficiently weak in comparison to the region of weld 39 that region 42 is more susceptible to deformation than is the weld region as a result of bending forces applied to the termination 12 through the terminal 15. As explained already, such bending forces would typically be applied in this manner during assembly of the transformer and, more specifically, when the termination is being bent and/or twisted to force its terminal 15 into proper mating engagement with a second terminal, such as the bushing stud 18. When working with terminations that had no such weak region, I found that bending forces applied to the termination through the terminal 15 during assembly were sometimes producing harmful cracks in the region of weld 39. The presence of the weakened region significantly reduces the chances for developing such cracks.

For the weak region 42 to function effectively in relieving the weld region 39 from such damaging stresses, the holes 40 must be relatively close to the weld region, but sufficient spacing must nevertheless be present to avoid undue heating of the weakened region 42 during the welding operation. Such undue heating can result in a destructive burn-through of the weakened region by heat from the welding arc (37). In a preferred embodiment of my invention, I utilize two holes 40 of 5/16 inch diameter, each spaced 19/32 inch from the center line of the lead, and locate both these holes with their center-lines a distance d of 9/16 inch from the welded outer edge 30. In this embodiment, I utilize a lead having a width w of 2.5 inches, a thickness t of 0.075 inches, and an angle e of 15° and a terminal having a width w' of 1.5 inches and a thickness t' of 0.125 inches. At the outer end of the lead 14, the lead is 0.2 inches wider than the terminal, i.e., dimension f on each side of the terminal is 0.1 inches. Other embodiments employ leads having widths of 2.3, 2.6, and 2.8 inches, respectively, with all the other dimensions being the same as above described.

To facilitate twisting and edge-bending of the lead, the lead is provided with generally V-shaped slots 50 in its longitudinally-extending edges. In a preferred form of the invention, each of these V-shaped slots 50 has an included angle of 60 degrees and a rounded apex with a 1/16 inch radius of curvature. As viewed in FIG. 3, the horizontal distance h between the apices of slots at opposite edges of the lead is 1.4 inches. To avoid unduly weakening the strips 14, the slots 50 are staggered along the length of the lead. This staggering is especially helpful in improving the ability of the lead to edge-bend without damage. The term "edge-bending" refers to bending in the plane of the lead.

It is to be understood that the dimensions referred to hereinabove are given by way of example and not limitation.

Terminations such as described above were subjected to extensive mechanical tests that demonstrated that the butt weld 39 was more resistant to mechanical failure than the region 42 containing the holes 40. More specifically, tensile pull tests carried to failure consistently resulted in a failure at the region 42 instead of at the weld 39. Bend tests carried to failure likewise consistently resulted in a failure at the region 42 instead of at the weld 39. In these bend tests, the termination was held about ½ inch below the region 42, and the termination was then repeatedly bent 90 degrees on each side of the plane containing the termination by applying force through the terminal 15. The termination consistently withstood more than 10 such bends in each direction without failure; but when failure ultimately occurred, it was at the region 42 rather than the weld 39.

Similarly, vibration tests showed that the weld 39 was rendered less susceptible to damage from vibrations as a result of the presence of the holes 40 and the edge notches 50.

In all of these cases, the weakened region 42 served to provide a strain relief which, in effect, protected the weld 39 by shifting stresses from the weld to the weakened region.

While the apparatus (10) shown in the drawings contains only one termination (12) connected to the bushing stud 18, it is sometimes desired to connect two or three, or even more, such terminations to such a stud. In such arrangements the terminals 15 are superimposed upon each other and clamped with nut 24 to the end of the stud. The above-described flexibility of the leads 14 allows the terminals to be brought together in such an arrangement without damage to the leads or the welds 39. The fact that the welds 39 are butt welds (instead of lap welds) is especially advantageous in such arrangements because the terminal faces are free to develop good contact with each other without interference from any overlapping portions of the leads and also because the absence of overlap results in a more compact assembly of reduced thickness.

While I have shown and described a particular embodiment of my invention, it will be obvious to those skilled in the art that various changes and modifications may be made without departing from my invention in its broader aspects; and I, therefore, intend herein to cover all such changes and modifications as fall within the true spirit and scope of my invention.

What I claim is:

1. A termination for high-current electrical apparatus, comprising:
   (a) a lead for the apparatus comprising an elongated strip of relatively soft aluminum having a distal end and an outer edge located at the distal end,
   (b) a terminal comprising a plate of relatively hard aluminum-base alloy having an edge facing the outer edge of the strip,
   (c) a butt weld between said edges comprising a fillet of aluminum alloy extending across the width of the terminal adjacent said edge of the terminal,
   (d) a plurality of holes in said lead adjacent said butt weld, said holes serving to weaken said lead sufficiently in the region of said holes so that the lead in the region of said holes is more susceptible to deformation than said weld as a result of bending forces applied to the termination through said terminal, and in which:
   (i) said strip has longitudinal edges that extend along its length, and
   (ii) generally V-shaped notches are provided in said longitudinal edges for reducing the resistance of the strip to twisting and edge-bending.

2. A termination as defined in claim 1 in which the V-shaped notches in one of the longitudinal edges of the strip are staggered along the length of the strip with respect to the V-shaped notches in the other longitudinal edge of th strip.

3. A termination as defined in claim 1 in which said strip is of an aluminum alloy consisting of at least 99.45% aluminum by weight, said terminal is of an aluminum alloy consisting essentially of aluminum, silicon, and magnesium, the aluminum constituting about 99% by weight of the alloy, and said butt-weld fillet is derived from an arc-melted filler of an aluminum alloy composed of aluminum and less than 10 percent by weight other constitutents, the major portion by weight of said other constituents being magnesium.

4. The termination of claim 1 in which the center lines of said holes are located less than one inch from the outer edge of the lead.

5. The termination of claim 1 in which the holes are about 5/16 inch in diameter and their center lines are located about 9/16 inch from the outer edge of the lead.

6. A termination for high-current electrical apparatus, comprising:
   (a) a lead for the apparatus comprising an elongated strip of relatively soft aluminum having a distal end and an outer edge located at the distal end,
   (b) a terminal comprising a plate of relatively hard aluminum-base alloy having an edge facing the outer edge of the strip,
   (c) a butt weld between said edges comprisning a fillet of aluminum alloy extending across the width of the terminal adjacent said edge of the terminal,
   (d) a plurality of holes in said lead adjacent said butt weld, said holes serving to weaken said lead sufficiently in the region of said holes so that the lead in the region of said holes is more susceptible to deformation than said weld as a result of bending force applied to the termination through said terminal, and in which:
   (i) at one side of said termination in the region of said edges said terminal has a broad surface located in a first predetermined plane and said strip has a broad surface located in a second predetermined plane, and
   (ii) said second plane is generally parallel to, slightly offset from, and recessed from said first plane, and said fillet has a generally V-shaped cross-section with the V pointing toward said first predetermined plane.

* * * * *